US006560166B1

(12) United States Patent

Saito et al.

(10) Patent No.: US 6,560,166 B1

(45) Date of Patent: May 6, 2003

(54) TIME RECORDER EQUIPPED WITH RADIO WAVE CLOCK

(75) Inventors: Yoshitaka Saito, Tokyo (JP); Takashi Sahara, Tokyo (JP)

(73) Assignee: Max Co., Ltd., Tokyo (JP)

(*) Notice: Subject to any disclaimer, the term of this patent is extended or adjusted under 35 U.S.C. 154(b) by 0 days.

(21) Appl. No.: 09/666,458

(22) Filed: Sep. 21, 2000

(30) Foreign Application Priority Data

Sep. 21, 1999 (JP) .......................................... 11-266958
Sep. 30, 1999 (JP) .......................................... 11-279025

(51) Int. Cl.[7] ................................................ G01D 9/00

(52) U.S. Cl. ............................ 368/47; 368/10; 346/20; 346/37; 455/344

(58) Field of Search ............................ 368/10, 46, 47, 368/52, 107; 346/20, 37, 145, 47; 455/344

(56) References Cited

U.S. PATENT DOCUMENTS 4,023,344 A * 5/1977 Mukaiyama ................. 368/47
4,423,314 A * 12/1983 Kato et al. ..................... 346/47
4,603,335 A * 7/1986 Koyasu ...................... 346/145
4,797,663 A * 1/1989 Rios ............................ 346/20
5,051,967 A * 9/1991 Dismond, III ............... 368/10
5,317,547 A * 5/1994 Oishi .......................... 368/10
5,621,703 A * 4/1997 Kanesaka .................... 368/47
5,793,707 A * 8/1998 Gauthier et al. .............. 368/10
6,613,030 * 5/2000 Gauthier et al. .............. 368/10
6,088,303 A * 7/2000 Oishi ......................... 368/107
6,219,303 B1 * 4/2001 Morohoshi et al. ........... 368/47
2001/0050694 A1 * 12/2001 Iwaki et al. .................. 346/20

* cited by examiner

*Primary Examiner*—David Martin
*Assistant Examiner*—Jeanne-Marguerite Goodwin
(74) *Attorney, Agent, or Firm*—Oblon, Spivak, McClelland, Maier & Neustadt, P.C.

(57) ABSTRACT

A time recorder with a standard time radio wave receiving function is provided and a time display manually adjusted can be used even when time data is received from a standard time radio wave. When the time recorder is set manually such that a time is not corrected based on a time data from the radio wave, a control unit does not correct the time on a displaying unit. When adjusting data is input manually and the time data receiving unit receives the time data of the radio wave, the control unit adjusts the time displayed on the displaying unit. Also, a mounting unit is attachably/detachably mounted to a time recorder main body, and a clocking unit and a time radio wave receiving unit for receiving standard time radio wave are provided in the mounting unit. Thus, when the standard time radio wave can not be received due to a position of the time recorder, the mounting unit is separated and moved from the time recorder main body to a position where the standard time radio wave is suitably received, so that the time of the clocking unit is corrected based on the standard time radio wave received by the time radio wave receiving unit.

7 Claims, 5 Drawing Sheets

TIME RECORDER EQUIPPED WITH RADIO WAVE CLOCK

BACKGROUND OF THE INVENTION

1. Field of the Invention

The present invention relates to a time recorder for recording in-time/out-time on a time card, and in particular to a time recorder equipped with a radio wave clock for receiving time data through radio wave and correcting time to be displayed on display means.

2. Description of the Related Art

Conventionally, time recorders for printing in-times/out-times of employees on time cards in order to record their attendance statuses have been known. Such a time recorder is provided with a time recorder main body having clocking means for performing clocking, a card insertion opening in which a time card is inserted and a time displaying device, and recording means provided in the time recorder main body for recording current time on a time card which has been inserted from the card insertion opening, and it is for displaying time on the basis of clocking of the clocking means on the display device and printing operated time on the time card by the recording means.

Regardless of a mechanical or electrical configuration of the clocking means, an advance or delay error always occurs more or less in time due to clocking error but it is necessary to always print correct time on the time card in view of the nature of the application of the time recorder and wrong time must be corrected such that the time recorder displays and prints correct time by any means such as manual time announcement adjustment.

In order to display time without delay or advance, radio wave clocks have become popular which receive correct time data notified by standard time radio wave sending time information by long waves or short waves periodically to correct the clocking means automatically and display correct time.

Time recorders with such a radio wave clock, each correcting wrong time automatically, have been used in recent years. In such a time recorder with a radio wave clock, time data is received from standard radio wave for each predetermined time elapse and the time is corrected on the basis of the time data so that correct time is always displayed and printed.

However, when a time recorder with a radio wave clock of this type is used, there occur the following problems in view of its configuration One problem is that it is popular that time display of a clock such as a time recorder is advanced by 5 or 10 minutes for punctuality by keeping a schedule with time to prevent lateness. In such a case, in a time recorder equipped with a radio wave clock, even when time to be displayed is adjusted such that 5 minutes are advanced, the time to be displayed is returned back to a correct time on the basis of the time data received from the standard time radio wave at a reception time of the radio wave, so that the advanced time for punctuality is cancelled at the reception time.

Also, when a time recorder equipped with a radio wave clock is used at a place difficult to receive standard time radio wave or it is used near another electronic equipment, there may occur a drawback that correcting operation is not performed correctly due to poor reception of the standard time radio wave and erroneous operation occurs. In such a case, it is desired that the correcting function performed on the basis of the radio wave clock of the time recorder is stopped.

Furthermore, since a time recorder is a precision machine, it is generally arranged in a room. However, due to the arrangement of the time recorder, there may occur a case that reception of the radio wave including the standard time is prevented. Also, there is an indication that, when there is a specific home electric equipment near the time recorder, the time recorder is affected by noises generated from the home electric equipment and the standard time radio wave can not be received satisfactorily. For this reason, when time is corrected by the standard time radio wave, such a counter-measure that the time recorder is moved at a window side near which there is no home electric equipment and where the radio wave can be received relatively satisfactorily is required according to the conditions for arrangement of the time recorder. However, there often occurs a problem about usage in view of convenience of users at a window side or a space for arrangement.

SUMMARY OF THE INVENTION

In view of the above circumstances, the present invention has been made and a first object thereof is to provide a time recorder equipped with a radio wave clock where a selection about whether or not a time correcting function of a radio wave clock is used can be made easily.

A second object of the present invention is to provide a time recorder equipped with a radio wave clock which can be used in a state where clocked time and displayed time are made different from each other by performing addition/subtraction of a predetermined time, while correct elapse is maintained by receiving time data from standard time radio wave.

A third object of the invention is to provide a time recorder with a standard time radio wave receiving action where receiving status of standard time radio wave regarding arrangement of the time recorder is not necessary to take in consideration.

In order to achieve the first object of the invention, according to a first aspect of the present invention, there is provided a time recorder equipped with a radio wave clock comprising clocking means which performs clocking, time data receiving means which receives time data from radio wave, displaying means which displays time, printing means which prints time displayed on the displaying means, and control means which displays time on the displaying means on the basis of the time obtained by the clocking means and which can correct the time displayed on the displaying means on the basis of the time data from the time data receiving means, the time recorder further comprising switching and selecting means which performs switching and selecting about whether or not the time is corrected on the basis of the time data from the radio wave, wherein, when setting is made so as not to correct the time on the basis of the time data from the radio wave by the switching and selecting means, the control means is set so as not to correct the time on the displaying means even when the time data receiving means receives the time data from the radio wave.

Also, in order to achieve the second object of the invention, according to a second aspect of the invention, there is provided a time recorder equipped with a radio wave clock comprising clocking means which performs clocking, time data receiving means which receives time data from radio wave, displaying means which displays time, printing means which prints time displayed on the displaying means, and control means which displays time on the displaying means on the basis of the time obtained by the clocking means and which can correct the time displayed on the displaying means on the basis of the time data from the time data receiving means, the time recorder further comprising data adjusting means which adjusts the time, wherein, when there is adjusting data effected by the data adjusting means and the time data receiving means receives time data from the standard time radio wave, the control means corrects time to be displayed on the displaying means by adding the adjusting data to the time data, whereby, while correct time elapse is maintained by receiving the time data from the standard time radio wave, the time recorder can be used in a state where clocking time and displaying time are made different from each other by performing addition/subtraction of a predetermined time.

Furthermore, in order to achieve the third object of the invention, according to a third aspect of the invention, there is provided a time recorder with a standard time radio wave receiving function, comprising a time recorder main body having a card insertion opening in which a time card is inserted, and printing means which is provided in the time recorder main body for printing time on the time card which is inserted from the card insertion opening, wherein a mounting unit is attachably/detachably mounted on the time recorder main body and clocking means for performing clocking and time radio wave receiving means for receiving standard time radio wave are provided in the mounting unit, wherein the time of the clocking means is corrected on the basis of the standard time radio wave received by the time radio wave receiving means, the time recorder main body is arranged at the most preferable position for use thereof, and, for correcting the clocking means, the mounting unit is separated from the time recorder main body and moved to the most preferable position for receiving the standard time radio wave to perform the correction of the clocking means, whereby it is unnecessary to take into consideration receiving conditions of standard time radio wave due to arrangement of the time recorder.

BRIEF DESCRIPTION OF THE DRAWINGS

Embodiments of the present invention will be explained below with reference to the drawings.

DESCRIPTION OF PREFERRED EMBODIMENTS

First Embodiment

A first embodiment of the invention will be explained with reference to the drawings.

Figure 1:
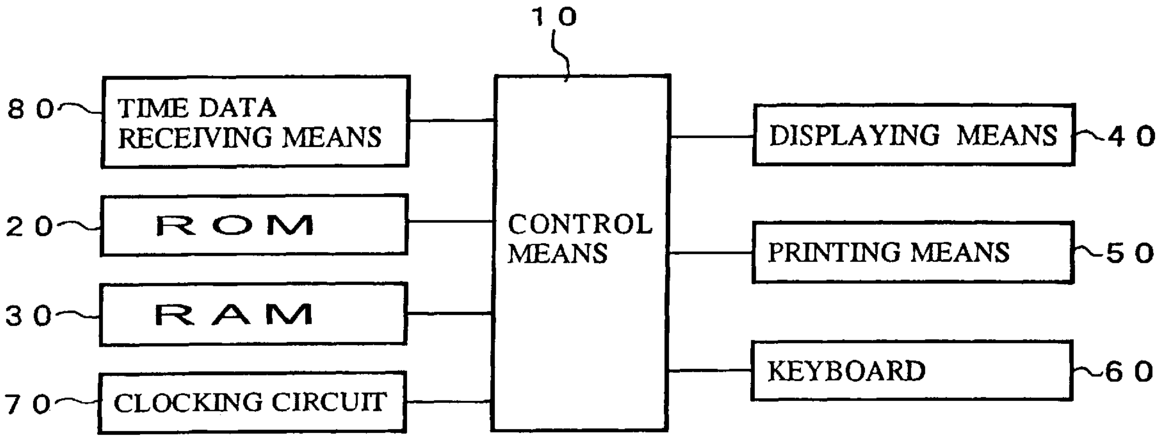
FIG. 1 is an explanatory diagram showing one example of a control circuit according to the present invention.

In FIG. 1, reference numeral 10 denotes control means such as an arithmetic control circuit or the like of a time recorder, 20 denotes a ROM (storage means) connected to the control means 10, 30 denotes a RAM (storage means) connected to the control means 10, 40 denotes displaying means such as a liquid crystal displaying unit or the like, which is connected to the control means 10, 50 denotes printing means connected to the control means 10, 60 denotes a keyboard connected to the control means 10, 70 denotes a clocking circuit connected to the control means 10, and 80 denotes time data receiving means connected to the control means 10.

The control means 10 performs operation control of the time recorder such as displaying, printing, key reading, controlling of a clock, data saving/calculating or the like according to a control program. The above control program is stored in the ROM 20, and time, error in operation or the like is displayed on displaying means 40. Also, the printing means 50 is used for printing time on a time card, print time elapse, printing rule marks or the like.

The keyboard 60 is used for setting the time recorder, selecting printing a column or the like. Also, the keyboard 60 can be used as switching and selecting means for performing switching and selecting about whether or not time is corrected on the basis of time data from radio wave, or as data correcting means for performing addition/subtraction of a predetermined time to/from the display time to correct data.

The clocking circuit 70 is an internal electronic clock of the time recorder, and it counts time to input the same into the control means 10. The time data receiving means 80 receives time data from standard radio wave to input it the control means.

Next, time correcting operation performed by the control means 10 of the time recorder thus configured will be explained with reference to a flowchart shown in FIG. 2. In this embodiment, since normal time counting, time displaying and printing operations are performed in the same manner as a conventional time recorder, and therefore illustration and detailed explanation thereof will be omitted.

When a switch (not shown) of the time recorder is turned on, the control means 10 reads the control program from the ROM 20 to initiate control operation, receives current time information of standard radio wave from the time data receiving means 80 to display current time on the displaying means 40 as an initial setting, and starts time counting operation effected by the clocking circuit 70. In addition to starting the time counting operation, a flow for time correction shown in FIG. 2 is started.

In Step S1, whether or not current time during time counting is a time correcting timing is determined. Then, when the current time is not the time correcting timing, the control routine is looped, and it moves to control for normal time counting, time displaying and printing operations (not shown) described below. When the current time is the time correcting time, the control routine advances to Step S2.

In Step S2, a determination is made about whether or not selection for using the time correcting function based on radio wave clock has been made. The selection about whether or not the time correcting function based on a radio wave clock is used is made by operation of the keyboard 60. In a case that selection that the time correcting function based on the radio wave clock is not used has been made, the control routine loops back, wherein clocked by the clocking circuit 70 is displayed on the displaying means 40 without correcting the clocked time, and normal clocking/time displaying/time printing operations (not shown) are performed.

When selection that the time correcting function based on the radio wave clock is used has been made, the control routine proceeds to Step S3.

In Step S3, time data is received by the time data receiving means 80, and the control routine proceeds to Step S4. In Step S4, the time which has been displayed on the displaying means 40 is corrected on the basis of the received time data, and the control routine loops back, wherein normal clocking/time displaying/time printing operations (not shown) are performed.

Figure 2:
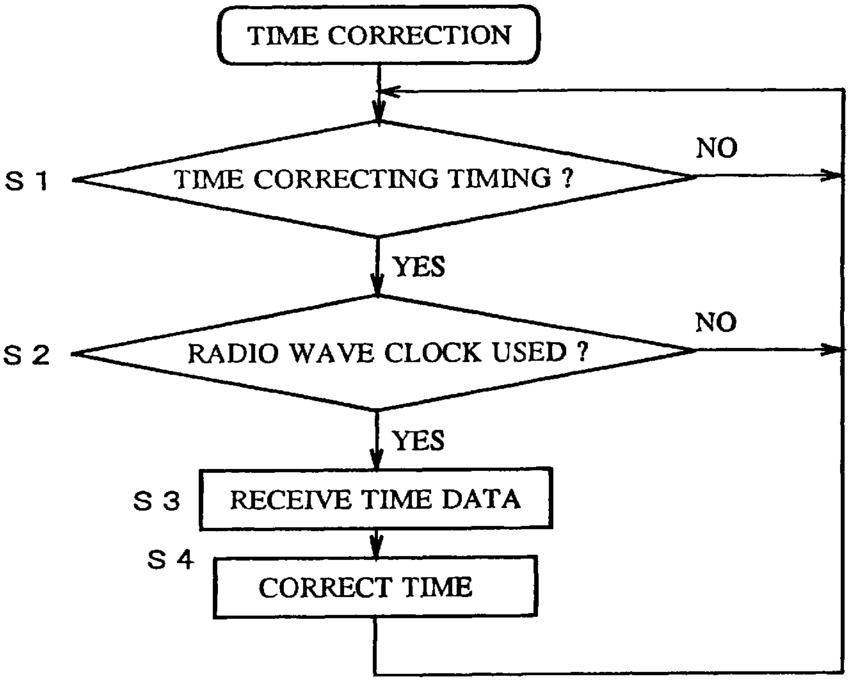
FIG. 2 is a flowchart explaining time correcting operation of a first embodiment of the present invention.

The time correcting operations shown in FIG. 2 are actuated and performed by the control means 10, for example, for every three hours elapse during the normal clocking/time displaying/time printing operations (not shown).

In the embodiment described above, the switching and selecting means is structured as a software switch turned on/off by the keyboard 60, but it may be structured as a hardware switch such as a toggle switch or the like which is provided independently of the keyboard 60.

Also, the time correcting operations shown in FIG. 2 are configured to be always referred irrespective of set situations of the switching and selecting means, but such a configuration can be employed that the control routine does not proceed to the time correcting operations shown in FIG. 2 when the switching and selecting means has been set such that the time correction based on radio wave clock is not used. In this case, since correction of time data is not performed automatically except for an initial setting time of the time recorder, it is necessary to perform correcting operation for clocking error separately.

According to the embodiment, there is provided the time recorder where setting about whether or not the time correcting function based on the radio wave clock is used can be made easily.

Second Embodiment

Figure 3:
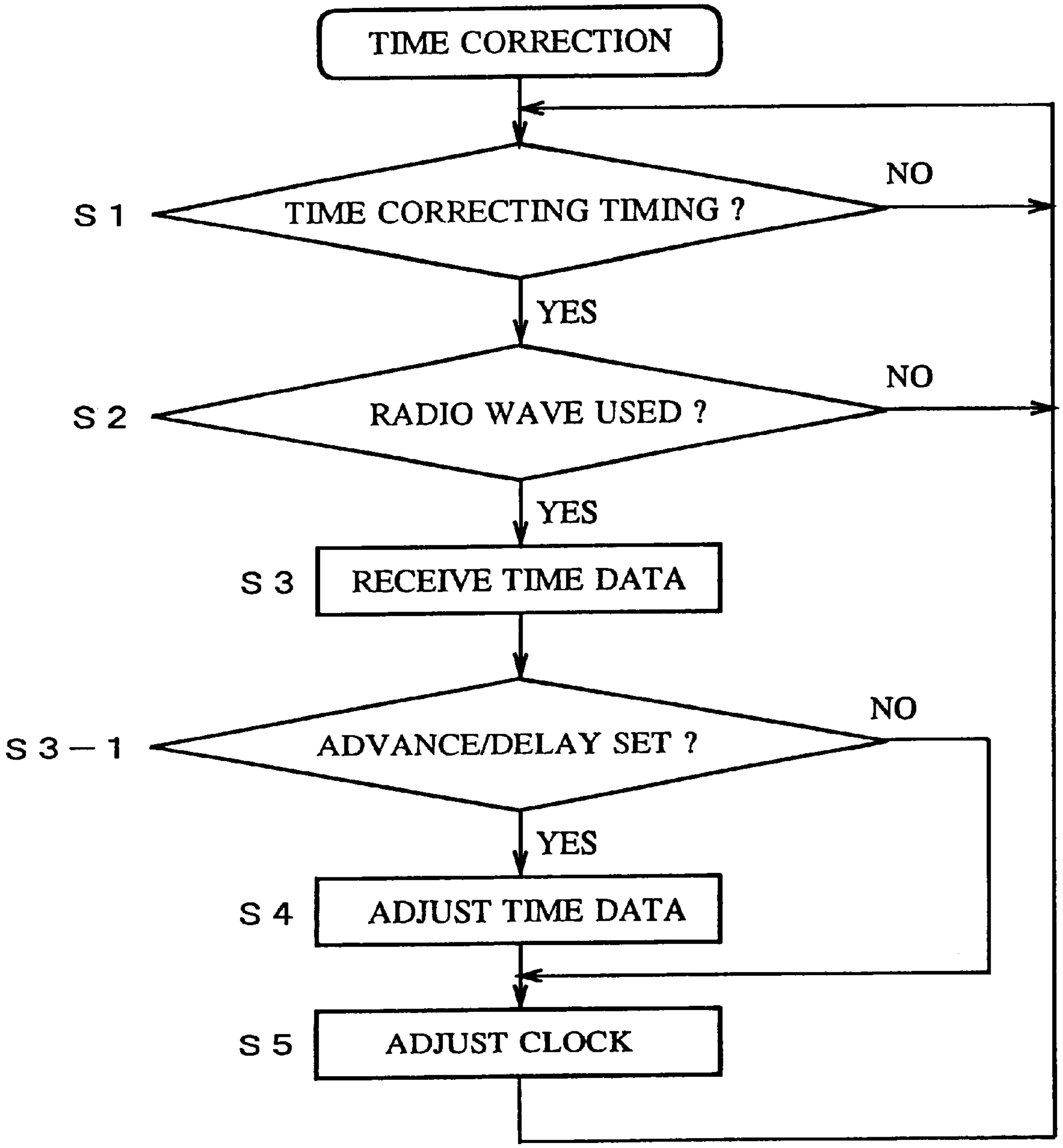
FIG. 3 is a flowchart explaining time correcting operation of a second embodiment of the present invention.

FIG. 3 shows time adjusting operations of a second embodiment of the present invention. The second embodiment of the invention is configured such that, when a time recorder is used in a state where time display of the time recorder is adjusted to advance, for example, by 5 minutes for the purpose of preventing lateness, an operation for advancing current time obtained by correction based on the radio wave clock by 5 minutes can be added. A basic control circuit is the same as the control circuit shown in FIG. 1.

When a switch (not shown) of the time recorder is turned on, the control means 10 reads a control program from the ROM 20 to initiate control operations, receives current time information of standard time radio wave from the time data receiving means 80 to display current time on the displaying means 40 as an initial setting, and starts clocking operation effected by the clocking circuit 70. In addition to staring the clocking operation, a flow for time correction shown in FIG. 3 is started.

In Step S1 shown in FIG. 3, a determination is made about whether or not current time is time correcting timing. Then, when current time is not time correcting timing, the control routine loops back, wherein normal clocking/time displaying/time printing operations (not shown) are performed. When the current time is the time correcting timing, the control routine advances to Step S2.

In Step S2, a determination is made about whether or not setting for using the time correcting function based on the radio wave clock has been made. Selection about whether or not the time correcting function based on the radio wave clock is used is performed by operation of the keyboard 60. Then, when selection where the time correcting function based on the radio wave clock is not used has been made, the control routine is looped back, where the time which has been measured by the clocking circuit 70 is displayed on the displaying means 40 as it is without correcting the time, and the control routine moves to the normal clocking/time displaying/time printing operations (not shown). When the selection where the time correcting function based on the radio wave clock is used has been made, the control routine proceeds to Step S3.

In Step S3, time data is received by the time data receiving means 80, and the received time data is stored in the RAM 30. Then, the control routine proceeds to Step 3-1.

In step 3-1, a determination is made about whether inputting and setting operation of time adjusting data (here, setting operation for advancing time by 5 minutes) has been performed by the keyboard 60. When the inputting and setting operation has been performed, the control routine proceeds to Step S4, while the control routine jumps Step S5 when the inputting and setting operation of the time adjusting data has not been performed. Incidentally, since the inputting and setting operation is always made effective until a set resetting operation is performed by the keyboard 60, even when the control routine loops along Steps 1 to 4, the control routine always proceeds to Step S4 once the inputting and setting operation has been performed and the control routine has proceeded to Step 3-1.

In Step 4, an adjusting value (here, +5 minutes) of the time data of the clocking circuit 70 based on the inputting and setting operation of the time adjusting data is stored in another area of the RAM 30, and the control routine proceeds to Step S5.

In Step S5, when the input and setting operation of the time adjusting data is not performed and the control routine proceeds from Step S3-1 to Step 5, the time displayed on the displaying means 40 is corrected to the correct current time on the received time data which has been stored in the RAM 30.

Also, when the control routine proceeds from Step S4 to Step S5, the time data which has been received and stored in the RAM 30 and the adjusting data (here, +5 minutes) which has been stored in the another area of the RAM 30 by inputting and setting operation for the time adjusting data are summed, and the time displayed on the displaying means 40 is adjusted to a time obtained by adding 5 minutes to the original correct time. Then, the control routine returns back to Step S1, wherein normal clocking/time displaying/time printing operation (not shown) is performed.

Incidentally, in the time adjustment performed in step S5 in a case that the control routine proceeds from Step S4 to Step S5, when time data which has been stored in the RAM 30 is, for example, 3:00 p.m. and the adjusting value is an advance of 5 minutes, 3:05 p.m. is obtained by adding 3:00 p.m. with 5 minutes and it is displayed on the displaying means 40 in Step S5.

Also, in the time adjustment performed in step S5 in a case that the control routine proceeds from Step S4 to Step S5, when time data which has been stored in the RAM 30 is, for example, 3:00 p.m. and the adjusting value is a delay of 5 minutes, 2:55 p.m. is obtained by subtracting 5 minutes from 3:00 p.m. and it is displayed on the displaying means 40 in Step S5.

Incidentally, this embodiment is structured such that the determination is made about presence/absence of the inputting and setting operation for time adjusting data in Step S3-1, and the control routine advances to one of Steps S4 and S5 on the basis of the determination in Step S3-1. However, the present invention may be structured such that the control routine always advances to Step S4 without making a determination about presence/absence of the setting operation and adjustment of 0 minute is performed when time adjusting data is not input and set, so that the flow for the time adjustment can be simplified.

Thus, according to this embodiment, since the time recorder is used such that the time adjusting value is added/subtracted to/from the original correct time data received and the resultant time is displayed on the displaying means 40, a time recorder can be obtained where an adjustment time obtained by arbitrarily adjusting an original correct time to a predetermined value has been always advanced or delayed correctly by a predetermined amount for the purpose of lateness prevention or the like.

Third Embodiment

Figure 4:
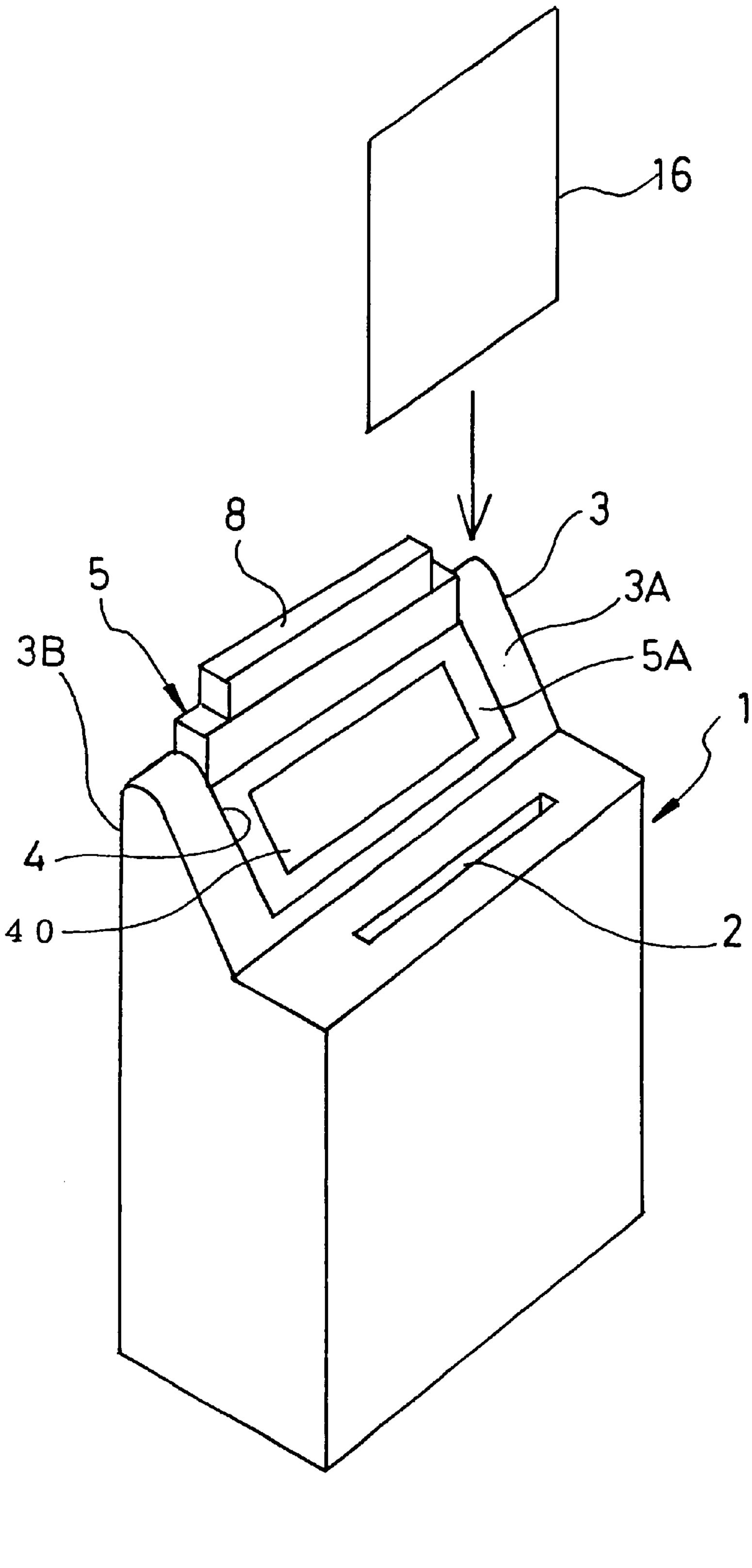
FIG. 4 is a perspective view showing an appearance of a time recorder according to the present invention.
Figure 5:
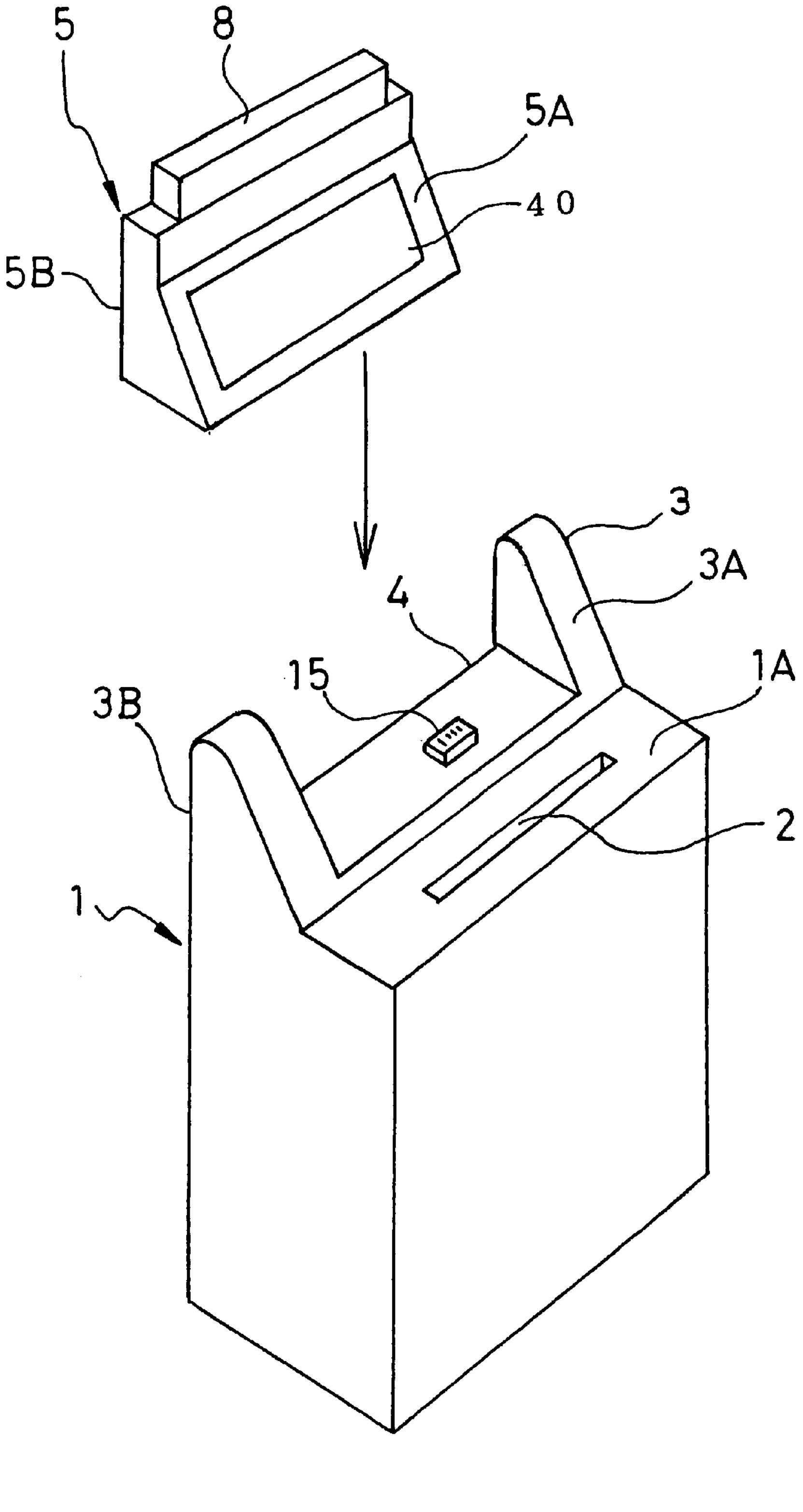
FIG. 5 is an explanatory diagram showing a state where a mounting unit is detached from a recorder main body.

In FIG. 4 and FIG. 5, reference numeral 1 denotes a time recorder main body, and a card insertion opening 2 is provided at a front side of an upper face 1A thereof. A bulging portion 3 projecting upwardly is formed rearward of the insertion opening 2, and a recessed portion 4 which is recessed from an upper portion of the main body 1 downward and which extends in front and rear directions (horizontal direction) is formed in the bulging portion 3. A mounting unit 5 having a front face 5A and a rear face 5B which are flush with a front face 3A and a rear face 3B is attachably/detachably mounted to the recessed portion 4.

The displaying means 40 is provided at the front face 5A of the mounting unit 5 for displaying time and the like, and a female connector 7 is provided at a bottom face of the mounting unit 5. Also, an antenna 8 for receiving standard time radio wave is provided at an upper portion of the mounting unit 5.

Figure 6:
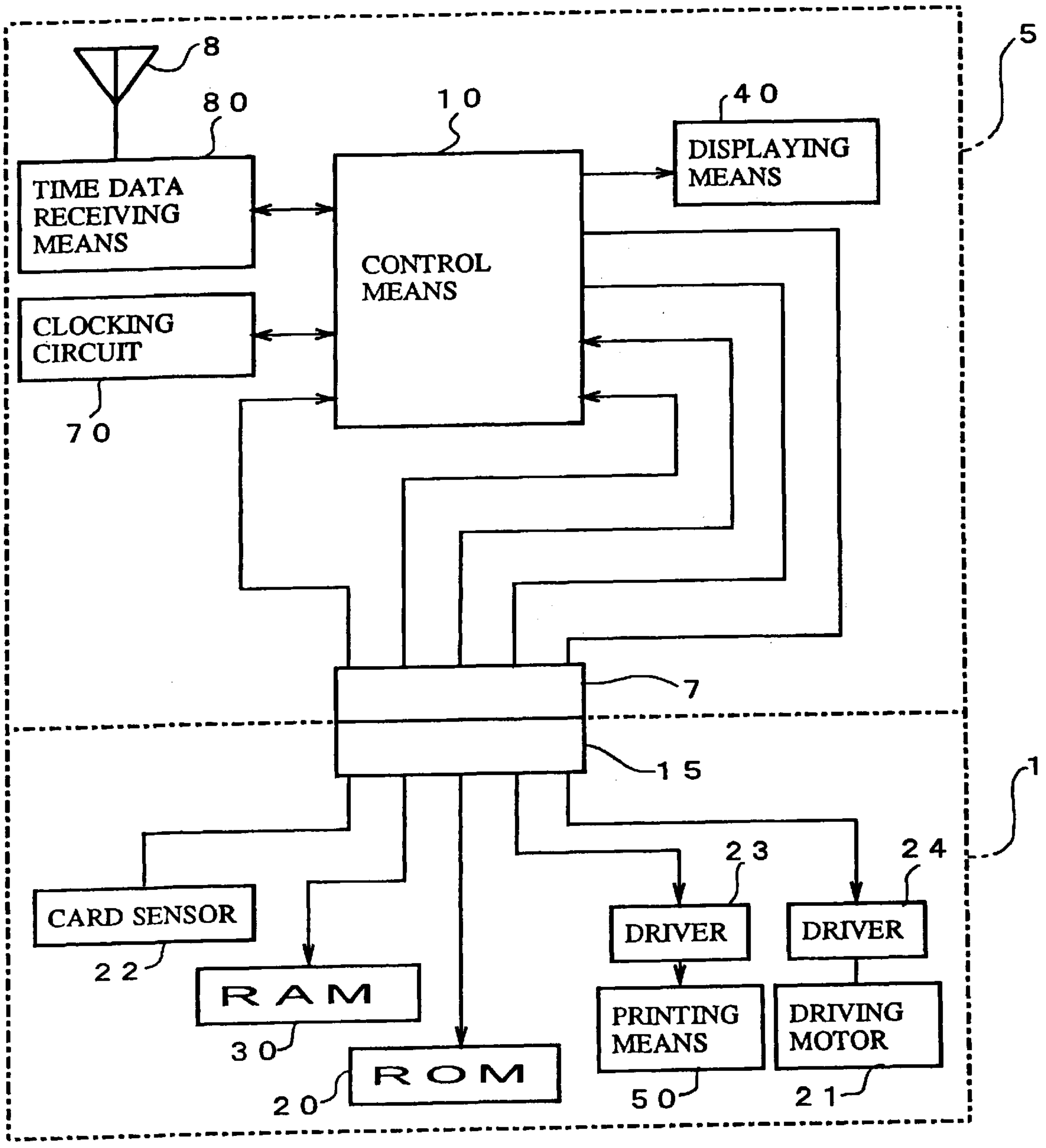
FIG. 6 is a block diagram showing a configuration of a control system of a time recorder.

As shown in FIG. 6, the time data receiving means 80 for detecting time data from standard time radio wave received at the antenna 8, a clocking means 70 for clocking time to determine current time, and control means 10 for performing such a control as a control for correcting time of the clocking means 70 on the basis of the time data to display the corrected time on the displaying means 40 or the like are provided within the mounting unit 5. The control means 10 comprises a CPU and the like. Also, a power supply portion (not shown) is built in the time recorder main body 1 and a battery (not shown) is built in the mounting unit 5, so that the battery is always put in a charged state when the main body 1 and the mounting unit 5 is connected to each other.

A male connector 15 connected to the female connector 7 of the mounting unit 6 is provided at the recessed portion 4 of the recorder man body 1.

A card sensor 22 for detecting a time card 16 which has been inserted into the card insertion opening 2, a driving motor 21 for drawing the time card 16 which has been inserted in the card insertion opening 2 up to a predetermined position, printing means 50 for printing time on the time card 16 which has been drawn in by the driving motor 21, a driver 23 for driving the printing means 50, a driver 24 for driving the driving motor 21, a ROM 20 storing a control program, a RAM 30 storing time data or the like, and the like are provided within the recorder main body 1.

Then, the card sensor 22, the drivers 23 and 24, the ROM 20 and the RAM 30 are connected to the control means 10 of the mounting unit 5 via the connectors 7 and 15.

The time recorder main body 1 and the mounting unit 5 are set up in their connected state at the most convenient place for daily use.

Next, operation of the time recorder structured in the above manner will be explained.

When a switch (not shown) of the time recorder is turned on, the control means 10 reads in the control program from the ROM 20 to start control operations according to the read-in control program, so that current time information of standard radio wave is received from the time data receiving means 80 to display current time on the displaying means 40 and starts clocking operation effected by the clocking means 70 as an initial setting and normal clocking/time displaying/time printing operations are started as the time recorder.

That is, the control means 10 determines whether or not the time card 16 has been inserted in the card insertion opening 2 on the basis of detection of the card sensor 22, and a waiting state is maintained unless the time card 16 is detected. On the other hand, current time clocked by the clocking circuit 70 is momentarily displayed on the displaying means 40.

When a detection that a time card 16 has been inserted in the card insertion opening 2 is made on the basis of detection of card sensor 22, the control means 10 controls the driver 24 to drive the driving motor 21 and draw the time card 16 up to the predetermined position by driving of the driving motor 21. Then, the control means 10 controls the driver 23 to drive the printing means 50 and print the time which has been displayed on the displaying means 40 on the time card 16 by driving of the printing means 50. Thereafter, the time card 16 is ejected.

In the time recorder of this embodiment, in a time zone when the time recorder is not used, for example, after all employees have gone home, the mounting unit 5 is detached from the recorder main body 1, and the mounting unit 5 is put at a position where standard time radio wave can securely received, for example, a widow side.

When a predetermined time comes, the control means 10 actuates the time data receiving means 80 and the time data receiving means 80 detects time data from standard time radio wave which has been received from the antenna 8. The control means 10 corrects the time of the clocking circuit 70 on the basis of the time data obtained by the detection and corrects the time displayed on the displaying means 40.

When the mounting unit 6 is put in a separated state from the recorder main body 1, power is supplied to the time data receiving means 80, the clocking circuit 70, the control means 10, the displaying means 40, and the like by the battery (not shown).

Next morning, namely, before a time zone when the time recorder is used for attendance of the employees, the mounting unit 5 is attached to the recorder main body 1. Then, when a time card 16 is inserted in the card insertion opening 2, the time recorder performs normal clocking/time displaying/time printing operations, and the printing means 50 prints time which the displaying means 40 displays on the time card 16. The time of the displaying means 40 is corrected by standard time radio wave in a time zone when the time recorder is not used and an error in clocking operation is set so as not to exceed one minute in one day, so that correct time can always be printed on a time card 16 according to this time recorder.

Thus, in the time recorder of this embodiment of the invention, since correcting time by standard time radio wave can be easily performed by separating the mounting unit 5 from the recorder main body 1 to carry only the mounting unit 5 to the predetermined position, it is unnecessary to carry the entire recorder main body 1 for time correction. For this reason, the time recorder of this embodiment is easy to carry for time correction, and it is very convenient for use.

In the above embodiment, the displaying means 40 and the control means 10 are provided to the mounting unit 5, but they may be provided to the recorder main body 1, of course.

In the above embodiments, the easy setting of the time correcting function, the addition/subtraction of the predetermined time, and the time correcting effected by standard time radio wave in the attachable/detachable mounting unit are respectively described in an independent manner. However, it is possible to implement a time recorder having these functions of the present invention in an integral manner.

Also, in the above embodiments, the time recorder for printing time on a time card 16 has been explained, but the present invention is applicable to a time recorder provided as a magnetic recording medium with a magnetic head for recording time by magnetic data or the like without any problem.

What is claimed is:

1. A time recorder equipped with a radio wave clock comprising clocking means which performs clocking, time data receiving means which receives time data from radio wave, displaying means which displays time, printing means which prints time displayed on the displaying means, and control means which displays time on the displaying means on the basis of the time obtained by the clocking means and which can correct the time displayed on the displaying means on the basis of the time data from the time data receiving means, wherein the time recorder comprises switching and selecting means which performs switching and selecting about whether or not the time is corrected on the basis of the time data from the radio wave, and wherein, when setting is made so as not to correct the time on the basis of the time data from the radio wave by the switching and selecting means, the control means is set so as not to correct the time on the displaying means even when the time data receiving means receives the time data from the radio wave.

2. A time recorder equipped with a radio wave clock comprising clocking means which performs clocking, time data receiving means which receives time data from radio wave, displaying means which displays time, printing means which prints time displayed on the displaying means, and control means which displays time on the displaying means on the basis of the time obtained by the clocking means and which can correct the time displayed on the displaying means on the basis of the time data from the time data receiving means, the time recorder further comprising data adjusting means which adjusts the time, wherein, when there is adjusting data effected by the data adjusting means and the time data receiving means receives time data from the radio wave, the control means is set to adjust time to be displayed on the displaying means by adding the adjusting data to the time data.

3. A time recorder comprising:

a time recorder main body having a card insertion opening in which a time card is inserted; and printing means provided within the time recorder main body for printing time on the time card which has been inserted from the card insertion opening, wherein a mounting unit is attachably/detachably mounted to the time recorder main body, and clocking means for performing clocking and time radio wave receiving means for receiving standard time radio wave are provided in the mounting unit, wherein a time of the clocking means is corrected based on the standard time radio wave received by the time radio wave receiving means, wherein the time recorder further comprises switching and selecting means which performs switching and selecting about whether or not the time is corrected based on the time data from the radio wave, and wherein, when setting is made so as not to correct the time based on the time data from the radio wave by the switching and selecting means, control means is set so as not to correct the time on the displaying means even when the time data receiving means receives the time data from the radio wave.

4. A time recorder comprising:

a time recorder main body having a card insertion opening in which a time card is inserted; and printing means provided within the time recorder main body for printing time on the time card which has been inserted from the card insertion opening, wherein a mounting unit is attachably/detachably mounted to the time recorder main body, and clocking means for performing clocking and time radio wave receiving means for receiving standard time radio wave are provided in the mounting unit, thereby correcting the time of the clocking means based on the standard time radio wave received by the time radio wave receiving means, wherein the time recorder further comprises a data adjusting means which adjusts the time, and wherein, when there is adjusting data effected by the data adjusting means and the time data receiving means receives time data from the radio wave, control means is set to adjust time to be displayed on the displaying means by adding the adjusting data to the time data.

5. A time recorder comprising:

a time recorder main body having a card insertion opening in which a time card is inserted and printing means provided within said time recorder main body for printing time on said time card which has been inserted from said card insertion opening; and a mounting unit which is detachably mounted on said time recorder main body;

said mounting unit including clocking means for performing clocking, time radio wave receiving means for receiving standard time radio wave, connector means for electrically connecting said time recorder main body to said mounting unit when said mounting unit is mounted on said time recorder main body, and control means for controlling the time of said clocking means and for correcting said time based on a standard time radio wave received by said time radio wave receiving means.

6. A time recorder according to claim 5, further comprising data adjusting means which adjusts the time when there is adjusting data effected by said data adjusting means and said time radio wave receiving means receives time data from the radio wave.

7. A time recorder according to claim 5, further comprising displaying means for displaying the time of said clocking means.

* * * * *